United States Patent
Huang

(10) Patent No.: US 9,485,041 B1
(45) Date of Patent: Nov. 1, 2016

(54) ANTENNA DEVICE CAPABLE OF MEASURING SIGNAL STRENGTH OF A RADIO FREQUENCY SIGNAL RECEIVED THEREBY

(71) Applicant: TRANS ELECTRIC CO., LTD., Changhua (TW)

(72) Inventor: Jeffrey Huang, Changhua (TW)

(73) Assignee: TRANS ELECTRIC CO., LTD., Changhua (TW)

( * ) Notice: Subject to any disclaimer, the term of this patent is extended or adjusted under 35 U.S.C. 154(b) by 0 days.

(21) Appl. No.: 14/994,223

(22) Filed: Jan. 13, 2016

(30) Foreign Application Priority Data

Aug. 25, 2015 (TW) .............................. 104213745 U

(51) Int. Cl.
*H04B 17/00* (2015.01)
*H04B 17/318* (2015.01)
*H04B 17/23* (2015.01)
*H04B 1/16* (2006.01)

(52) U.S. Cl.
CPC ............ *H04B 17/318* (2015.01); *H04B 17/23* (2015.01)

(58) Field of Classification Search
CPC .... H04B 1/1027; H04B 17/00; H04B 17/23; H04B 17/318

USPC .............................. 455/226.1–226.4; 343/703
See application file for complete search history.

(56) References Cited

U.S. PATENT DOCUMENTS

| 7,504,941 | B1* | 3/2009 | Taskin | ................ H04L 12/4625 340/539.21 |
| 9,270,309 | B2* | 2/2016 | Moiraghi | ................ H03F 3/191 |
| 2007/0152903 | A1* | 7/2007 | Lin | ........................ H01Q 3/242 343/795 |
| 2014/0248845 | A1* | 9/2014 | Pendergrass | ........... H04B 17/21 455/226.2 |

* cited by examiner

*Primary Examiner* — Lee Nguyen
(74) *Attorney, Agent, or Firm* — McClure, Qualey & Rodack, LLP

(57) ABSTRACT

An antenna device includes an antenna for receiving an RF signal and generating an antenna signal associated with the RF signal, and a measuring device. The measuring device includes a measurement unit, a processing unit and a display unit. The measurement unit receives the antenna signal, and outputs a voltage signal associated with the antenna signal. The processing unit obtains a strength signal according to the voltage signal. The display unit has a plurality of lighting elements configured to light with different colors, and displays an indication of signal strength of the RF signal according to the strength signal by a number of the lighting elements that emit light and by color of the light.

10 Claims, 3 Drawing Sheets

ANTENNA DEVICE CAPABLE OF MEASURING SIGNAL STRENGTH OF A RADIO FREQUENCY SIGNAL RECEIVED THEREBY

CROSS-REFERENCE TO RELATED APPLICATION

This application claims priority of Taiwanese Application No. 104213745, filed on Aug. 25, 2015.

FIELD

The disclosure relates to an antenna device, and more particularly to an antenna device capable of measuring signal strength of a radio frequency signal received thereby.

BACKGROUND

Radio frequency (RF) signals with a high frequency band used for audio/video transmission of a digital television are easily blocked by buildings or landform, and multipath interference may occur in transmission of the RF signals due to signal reflection. Therefore, in order to receive the RF signals with a relatively great quality, an antenna used for receiving the RF signals is usually set up outdoors and at a relatively high place. However, in this kind of setup, the antenna may be far from a media playing device (e.g., a digital television) that is used for playing media content carried by the RF signals. In addition, the antenna and the media playing device may be placed on different floors. As a result, it is hard to check immediately whether the placement of the antenna results in the best quality of the received RF signals.

In order to perform the checking, two persons need to cooperate with each other. One person watches the media played by the media playing device to determine the quality of the received RF signals, and guides the other person to adjust the placement of the antenna. However, this is inconvenient and time consuming. Further, the determination of the quality of the received RF signals is a subjective determination, and there is no objective standard to determine whether the placement of the antenna is optimal.

Another way to check immediately the placement of the antenna is to measure the RF signals using an instrument which can measure signal strength of the RF signals at a particular location and provide objective measurement result to a user, such that the user can adjust the antenna according to the measurement result. However, the measurement result of the signal strength is related to the RF signals received by the instrument, and thus, there may be a difference from the signal strength of the RF signals actually received by the antenna. Besides, the instrument displays a value to indicate the measurement result. Generally speaking, a greater value means greater signal strength. However, the RF signals having excessive signal strength may cause distortion of the media played by the media playing device, and ordinary people not skilled in the art is not knowledgeable in the appropriate range of the value.

SUMMARY

Therefore, an object of the disclosure is to provide an antenna device for measuring signal strength of a radio frequency (RF) signal received thereby.

According to the disclosure, the antenna device includes an antenna configured for receiving the RF signal and generating an antenna signal associated with the RF signal, and a measuring device. The measuring device includes a measurement unit, a processing unit, and a display unit.

The measurement unit includes a band-pass filter, an amplifier and an RF log detector. The band-pass filter is configured to receive from the antenna the antenna signal, and to filter the antenna signal by passing signal components of the antenna signal that have frequencies within a specific frequency band so as to output a filtered signal. The amplifier is configured to receive the filtered signal from the band-pass filter, and to amplify the filtered signal according to a gain value so as to output an amplified signal. The RF log detector is configured to receive the amplified signal from the amplifier, and to output a voltage signal according to power level of the amplified signal based on a logarithmic slope.

The processing unit is electrically connected to the measurement unit. The processing unit is configured to receive the voltage signal, and to obtain a strength signal according to the voltage signal, the gain value and the logarithmic slope.

The display unit is electrically connected to the processing unit, and is configured to receive the strength signal and to display an indication of the signal strength of the RF signal according to the strength signal. The display unit has a plurality of lighting elements configured to light with different colors.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Before describing this invention in detail, it should be noted herein that throughout this disclosure, when two elements are described as being "coupled in series," "connected in series" or the like, it is merely intended to portray a serial connection between the two elements without necessarily implying that the currents flowing through the two elements are identical to each other and without limiting whether or not an additional element is coupled to a common node between the two elements. Essentially, "a series connection of elements," "a series coupling of elements" or the like as used throughout this disclosure should be interpreted as being such when looking at those elements alone.

Figure 1:
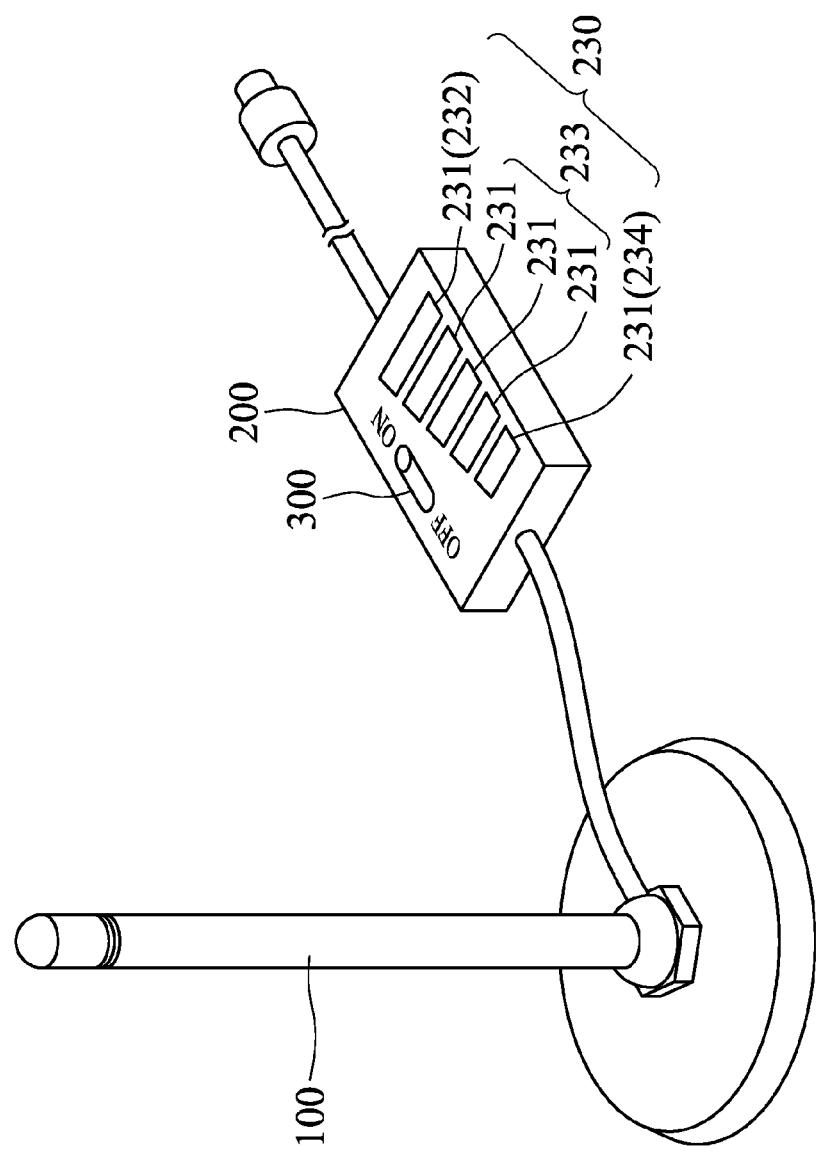
FIG. 1 is a schematic diagram illustrating an embodiment of an antenna device according to the disclosure.
Figure 2:
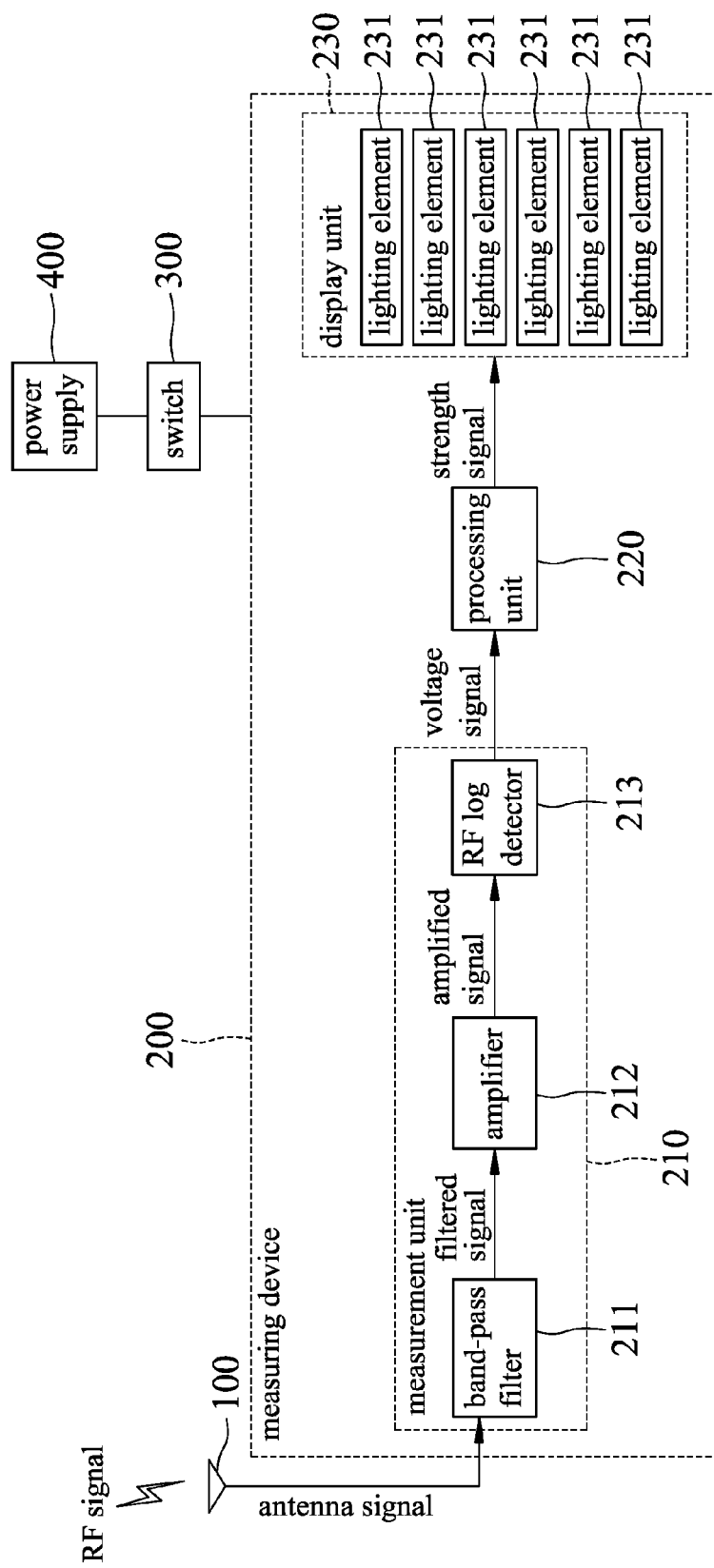
FIG. 2 is a block diagram illustrating the embodiment of the antenna device according to the disclosure.

Referring to FIGS. 1 to 2, the embodiment of an antenna device for measuring signal strength of a radio frequency (RF) signal received thereby according to this disclosure is described below.

The antenna device includes an antenna 100, a measurement device 200, a switch 300 and a power supply 400.

The antenna 100 is configured to receive an RF signal and to generate an antenna signal associated with the RF signal.

The measuring device 200 includes a measurement unit 210, a processing unit 220 and a display unit 230.

Figure 3:
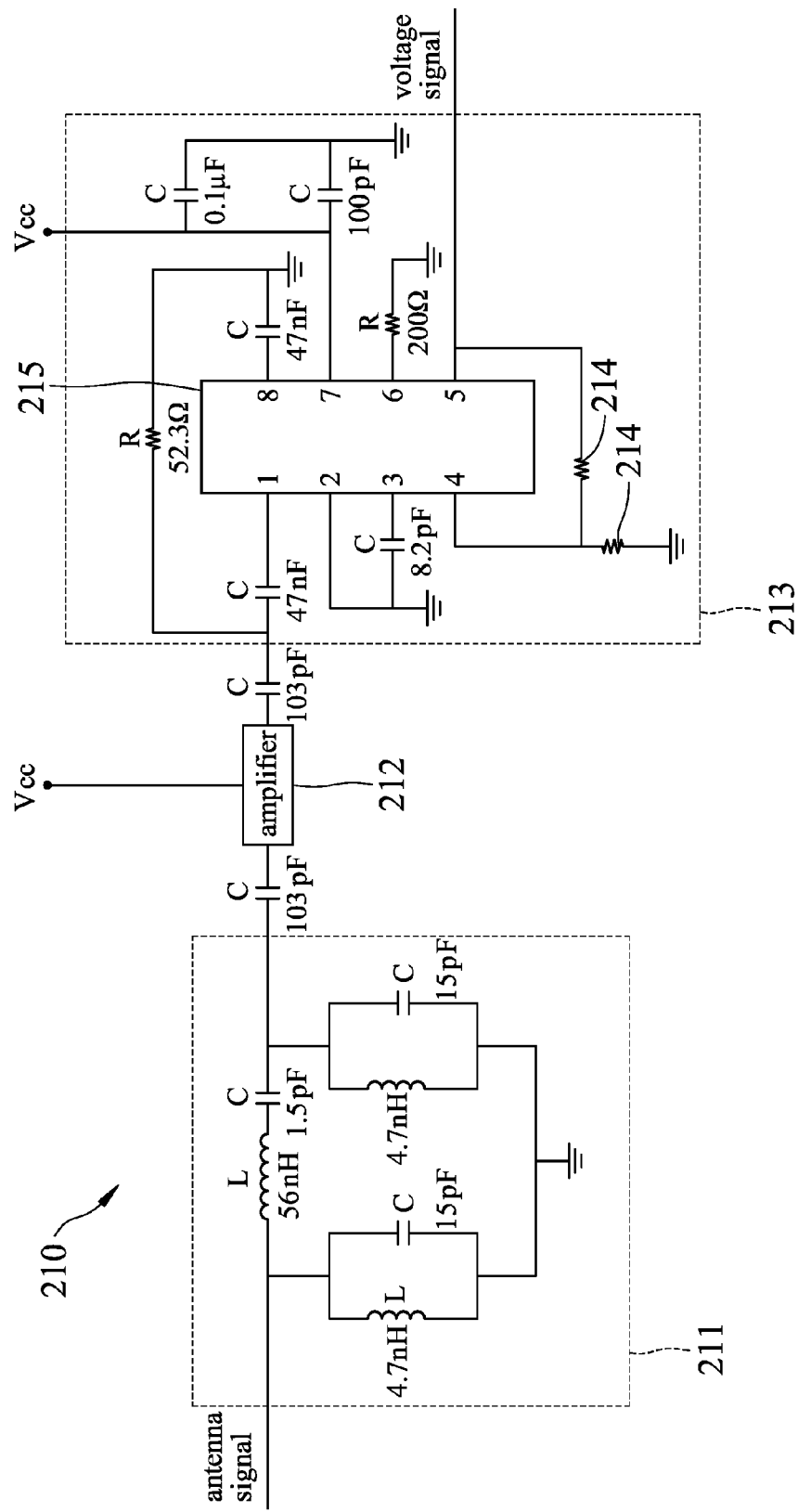
FIG. 3 is a circuit diagram illustrating an embodiment of a measurement unit according to the disclosure.

Referring to FIGS. 1 to 3, the measurement unit 210 includes a band-pass filter 211, an amplifier 212 and an RF log detector 213. The RF log detector 213 includes two resistors 214 connected to each other in series at a common node (N), and a demodulating logarithmic amplifier 215 having a setpoint control input electrically connected to the common node (N) of the resistors 214. In this embodiment, the amplifier 212 is a low noise amplifier.

The display unit 230 includes a plurality of lighting elements 231 configured to light with different colors and are grouped into three signal strength indicators 232-234 according to the colors of the light emitted by the lighting elements 231. In particular, each of the signal strength indicators 232-234 consists of at least one of the lighting elements 231, and corresponds to light having a respective color. In this embodiment, each of the lighting elements 231 is a light-emitting diode (LED), and the number of the signal strength indicators is three.

The switch 300 is electrically coupled to the power supply 400, and is configured to allow the power supply 400 to supply electric power to the measuring device 200. For example, the switch 300 is user-operable, and makes the power supply 400 provide the electric power when the switch 300 is turned on. To be noted, the power supply 400 applies a bias voltage (Vcc) to each of the amplifier 212 and the RF log detector 213 as shown in FIG. 3. The bias voltages (Vcc) applied respectively to the amplifier 212 and the RF log detector 213 may have different voltage values, and may be decreased or increased according to design requirement of the circuit of the measuring device.

The band-pass filter 211 is electrically coupled to the antenna 100. The band-pass filter 211 is configured to receive from the antenna signal the antenna 100, and to filter the antenna signal by passing signal components of the antenna signal that have frequencies within a specific frequency band so as to output a filtered signal. In this embodiment, the specific frequency band ranges from 470 MHz to 700 MHz, which is the frequency band for digital television signals. In this embodiment, the band-pass filter 211 is embodied as an LC circuit for filtering the antenna signal. The amplifier 212 is configured to receive the filtered signal from the band-pass filter 211, and to amplify the filtered signal according to a gain value so as to output an amplified signal. To be noted, the amplifier 212 requires a low noise factor and a high gain value, and has an impedance matching with an input circuit thereof (i.e., the band-pass filter 211). Since the amplifier 212 has a low noise factor and a high gain value, a noise factor of the whole circuit of the measuring device is decreased. Thus, the measuring device can have a relatively great sensitivity to receipt of signals having relatively low signal strength.

The RF log detector 213 is configured to receive the amplified signal from the amplifier 212, and to output a voltage signal according to power level of the amplified signal based on a logarithmic slope. In this embodiment, the RF log detector 213 is embodied as an integrated circuit. According to a data sheet of the demodulating logarithmic amplifier 215, the demodulating logarithmic amplifier 215 has a fourth pin serving as the setpoint control input, and the logarithmic slope is a ratio of a voltage value of the voltage signal to the power level of the amplified signal and is a negative value (−22V/dBm) and is positively proportional to voltage at the setpoint control input (i.e., the voltage at the common node (N)). The resistors 214 are electrically connected between a fifth pin of the demodulating logarithmic amplifier 142 (i.e., a measurement and controller output) and ground, and the fourth pin is electrically connected to the common node (N). By designing resistance values respectively of the resistors 214, the logarithmic slope is set up at a range between −22 V/dBm and −66 V/dBm. In addition, the logarithmic slope is related to sensitivity about determination of the signal strength, and to a measurement range of the power level of the amplified signal that is acceptable to the RF log detector 213. In detail, for the same variation of the voltage signal in voltage, a smaller absolute value of the logarithmic slope results in a greater measurement range of the power level of the amplified signal and a lower sensitivity about the variation of the voltage signal. On the contrary, with a greater absolute value of the logarithmic slope, the measurement range becomes smaller, and the sensitivity about the variation of the voltage signal becomes higher. In practice, the value of the logarithmic slope can be adjusted according to the receiving performance of the antenna 100. Better receiving performance of the antenna 100 means that the variation of the power level of the amplified signal is more significant, and the absolute value of the logarithmic slope can be smaller. On the contrary, when the antenna 100 has poorer receiving performance, the absolute value of the logarithmic slope should be greater.

To be noted, since the antenna signal is a high-frequency signal, the antenna signal may be returned when electrical impedances of electronic components of the measuring device do not match. Therefore, the band-pass filter 211, the amplifier 212 and the RF log detector 213 of the measurement unit 210 need to be carefully designed for the impedance matching. As shown in FIG. 3, the circuit diagram of the measurement unit 210 illustrates impedance values respectively of several passive components (such as resistors (R), capacitors (C) and inductors (L)) and connection relationship thereamong for the impedance matching. Another way to achieve the impedance matching is to use discrete circuits including individual electronic components or to use a printed circuit board. In practice, the Smith chart is used to assist in the impedance matching.

The processing unit 220 is electrically connected to the measurement unit 210, and is configured to receive the voltage signal from the RF log detector 213, to obtain a strength signal according to the voltage signal, the gain value and the logarithmic slope, and to output the strength signal to the display unit 230. In this embodiment, the strength signal is expressed in decibels (dBs), and the processing unit 220 is configured to compute the strength signal according to the following equation:

$$S=V/(G \times m),$$

where S is the strength signal, V is the voltage value of the voltage signal, G is the gain value, and m is the logarithmic slope.

The display unit 230 is electrically connected to the processing unit 220, and is configured to receive the strength signal and to display an indication of the signal strength of the RF signal according to the strength signal. To be noted, rather than by the numeral, the display unit 230 displays the indication of the signal strength in a direct, intuitive way by a number of the lighting elements 231 that emit light and by the colors of the light emitted by the lighting elements 231. In this embodiment, a first one of the signal strength indicators 232 has one lighting element 231 configured to emit red light, and is used to indicate that the signal strength is greater than an upper limit. A second one of the signal strength indicators 234 has one lighting element 231 configured to emit yellow light, and is used to indicate that the signal strength is lower than a lower limit or at a barely acceptable value. A third one of the signal strength indicators 233 has at least two of the lighting element 231. In this embodiment, the signal strength indicator 233 has three lighting elements 231 configured to emit green light for indicating that the signal strength is within an appropriate range between the upper limit and the lower limit. In other embodiments, the number of the lighting elements 231 of the signal strength indicator 233 can be any number more than one. The signal strength within the appropriate range is further quantified and indicated by a number of the lighting elements 231 that are emitting green light. For example, when the signal strength is lower than 37 dB μ V, the lighting element 231 of the signal strength indicator 234 emits yellow flashlight to indicate that the signal strength is too weak. When the signal strength is between 37 dB μ V and 49 dB μ V, the lighting element 231 of the signal strength indicator 234 continuously emits yellow light to inform the user that the signal strength is barely acceptable and the user should look for a better place for setting up the antenna 100 and adjust arrangement of the antenna 100. When the signal strength is between 50 dB μ V and 80 dB μ V, the lighting elements 231 of the signal strength indicator 233 are turned on to emit green light one by one for every 10 dB μ V difference from 50 dB μ V to 80 dB μ V for quantifying the signal strength. The signal strength of the RF signal between 50 dB μ V and 80 dB μ V is sufficient for a media playing device to play clear media content associated with the RF signal. However, the signal strength of the RF signal may vary due to the weather and the transmission cable, and thus, the signal strength indicator 233 has more than one lighting element 231 for providing relatively more precise indication of the signal strength. When the signal strength is greater than 80 dB μ V, it means that the signal strength is too high, and the lighting element 231 of the signal strength indicator 232 is turned on to emit red light to inform the user to look for a better place for setting up the antenna 100 or adjust the arrangement of the antenna 100.

In sum, by virtue of the lighting elements 231, the measuring device 200 can quantify the signal strength of the RF signal received from the antenna 100 with reference to a number of the lighting elements 231 turned on to emit light and the color of the light emitted by the lighting elements 231. Thus, the measuring device 200 according to this disclosure can help the user directly find a better place for setting up the antenna 100 or adjust the arrangement of the antenna 100 to obtain better signal strength.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An antenna device capable of measuring signal strength of a radio frequency (RF) signal received thereby, said antenna device comprising:
    an antenna configured for receiving the RF signal and generating an antenna signal associated with the RF signal; and
    a measuring device including
        a measurement unit that includes
            a band-pass filter configured to receive the antenna signal from said antenna, and to filter said antenna signal by passing signal components of the antenna signal that have frequencies within a specific frequency band so as to output a filtered signal,
            an amplifier configured to receive the filtered signal from said band-pass filter, and to amplify the filtered signal according to a gain value so as to output an amplified signal, and
            an RF log detector configured to receive the amplified signal from said amplifier, and to output a voltage signal according to power level of the amplified signal based on a logarithmic slope,
        a processing unit that is electrically connected to said measurement unit, and that is configured to receive the voltage signal, and to obtain a strength signal according to the voltage signal, the gain value and the logarithmic slope, and
        a display unit that has a plurality of lighting elements configured to light with different colors, that is electrically connected to said processing unit, and that is configured to receive the strength signal and to display an indication of the signal strength of the RF signal according to the strength signal.

2. The antenna device as claimed in claim 1, wherein said display unit is configured to display the indication by a number of said lighting elements that emit light and by color of the light.

3. The antenna device as claimed in claim 2, wherein said lighting elements are grouped by color into a plurality of signal strength indicators, a first one of said signal strength indicators has one of said lighting elements for indicating that the signal strength is greater than an upper limit, and a second one of said signal strength indicators has another one of said lighting elements for indicating that the signal strength is lower than a lower limit.

4. The antenna device as claimed in claim 3, wherein a number of said signal strength indicators is three, and a third one of said signal strength indicators has at least two of said lighting elements for indicating that the signal strength is between the upper limit and the lower limit with the signal strength being indicated by a number of said at least two of said lighting elements that are turned on to emit light.

5. The antenna device as claimed in claim 1, wherein the logarithmic slope is a ratio of a voltage value of the voltage signal to the power level of the amplified signal, and ranges from −22 V/dBm to −66 V/dBm.

6. The antenna device as claimed in claim 1, wherein said RF log detector includes two resistors connected to each other in series at a common node, and a demodulating logarithmic amplifier having a setpoint control input electrically connected to the common node of said resistors, and wherein the logarithmic slope is related to voltage at the common node.

7. The antenna device as claimed in claim 1, further comprising a switch electrically coupled to a power supply, and configured to allow the power supply to provide electric power to said measuring device.

8. The antenna device as claimed in claim 1, wherein said band-pass filter is configured to filter the antenna signal by passing the signal components of the antenna signal that have frequencies within the specific frequency band ranging from 470 MHz to 700 MHz.

9. The antenna device as claimed in claim 1, wherein said amplifier is a low noise amplifier.

10. The antenna device as claimed in claim 1, wherein each of said lighting elements is a light-emitting diode.

* * * * *